United States Patent [19]

Fukuroi et al.

[11] Patent Number: 4,494,922
[45] Date of Patent: Jan. 22, 1985

[54] APPARATUS FOR STAMPING FILAMENTARY MATERIAL FOR HELICALLY COILED SLIDE-FASTENER COUPLING ELEMENTS

[75] Inventors: Takeo Fukuroi; Shigenori Omori, both of Uozu; Akira Tanaka, Kurobe, all of Japan

[73] Assignee: Yoshida Kogyo K. K., Tokyo, Japan

[21] Appl. No.: 511,650

[22] Filed: Jul. 7, 1983

[30] Foreign Application Priority Data

Jul. 12, 1982 [JP] Japan .................. 57-120827

[51] Int. Cl.³ .................. A01J 21/00; A01J 25/12
[52] U.S. Cl. .................. 425/324.1; 28/279; 57/9; 264/252; 264/281; 264/284; 425/385; 425/391; 425/814
[58] Field of Search .................. 28/278, 279; 57/9; 264/103, 167, 168, 252, 280, 281, 284, 286; 425/814, 324.1, 385, 391

[56] References Cited

U.S. PATENT DOCUMENTS

| 3,152,433 | 10/1964 | Burbank | 57/18 |
| 3,255,288 | 6/1966 | Steingruebner | 425/814 |
| 3,572,023 | 3/1971 | Galonska | 425/391 |
| 3,703,026 | 11/1972 | Uhrig | 264/284 |
| 4,257,839 | 3/1981 | Yoshida et al. | 425/814 |

Primary Examiner—Jay H. Woo
Assistant Examiner—Timothy W. Heitbrink
Attorney, Agent, or Firm—Hill, Van Santen, Steadman & Simpson

[57] ABSTRACT

A stamping apparatus disclosed deforms a filamentary material to provide coupling heads and the like at predetermined intervals along the length of the filament which is to be coiled and attached to stringer tapes for a slide fastener. The apparatus includes a pair of stamping rolls which are rotatable in opposite directions on their own axes simultaneously as they orbit about the axis of a rotor. A ring member rotatably connected to the stamping rolls is driven via the same power source as the rotor but rotates at a slower or faster angular speed than the rotor, the resulting angular speed differential being utilized to effect the rotation of the stamping rolls on their axes.

6 Claims, 13 Drawing Figures

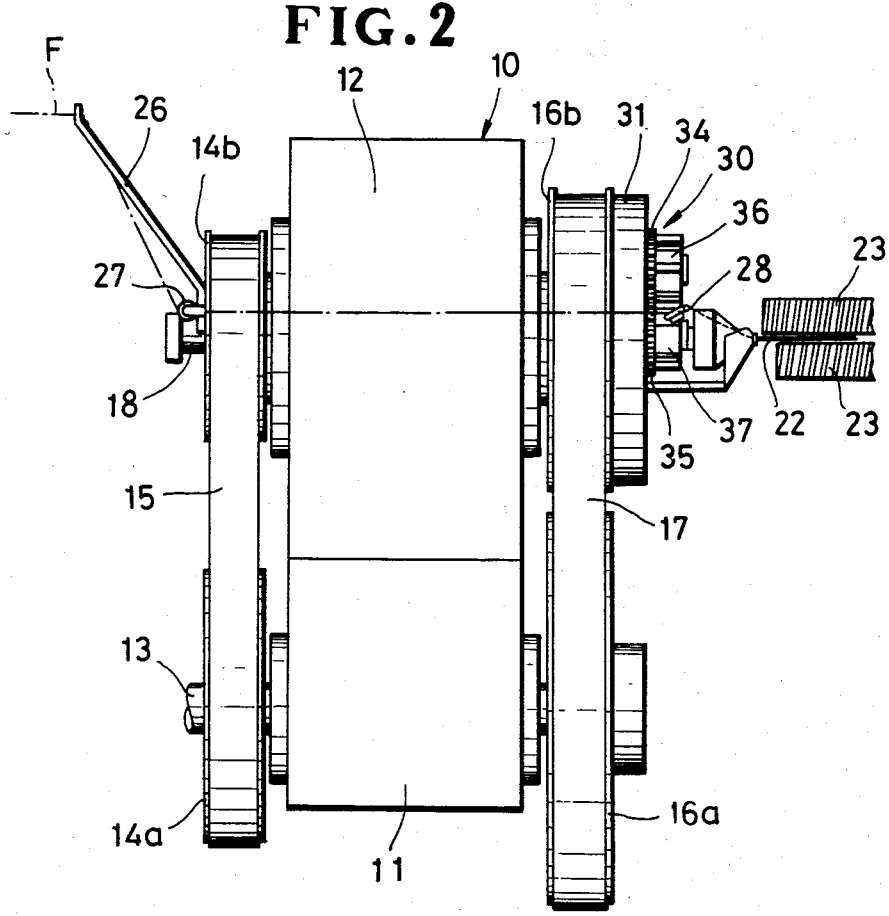

APPARATUS FOR STAMPING FILAMENTARY MATERIAL FOR HELICALLY COILED SLIDE-FASTENER COUPLING ELEMENTS

BACKGROUND OF THE INVENTION

1. Field of the Invention

This invention relates to an apparatus for producing helically coiled coupling elements to be affixed to slide fastener stringer tape and more particularly to an apparatus incorporating stamping means for continuously providing a coupling head portion, a turn portion, a stitching groove and the like at predetermined intervals along the length of a plastic filament prior to winding thereof on a mandrel.

2. Prior Art

Known stamping or forming tools are either of a rotary design or a punch type, but the former is preferred for high speed and accuracy of performance. Efforts have been made to explore means for stamping a filamentary wire material during a course of travel up to the point of winding on a mandrel. In order to effect this stamping without causing twists or wraps in the filament, it is imperative that the stamping means be installed as close to the mandrel as possible. This need coupled with the necessity of enabling the stamping means to rotate on its own axis simultaneously as it makes an orbital movement, poses a great difficulty in the designing, building and operation of such stamping apparatus.

SUMMARY OF THE INVENTION

Exhaustive research and development activities of the present co-inventors have resulted in the perfection of an apparatus which is capable of "stamp forming" a plastic filament as desired without twists or other defects in the filament.

Briefly stated, the present invention provides a rotor, a pair of inter-engaged stamping rolls rotatably mounted on the rotor, and a reel mounted coaxially with the rotor but rotative at a different angular speed from the rotor to permit the stamping rolls to turn on their own axes while making an orbital movement.

According to the present invention, an apparatus includes a stationary shaft mounted on a frame and having a mandrel extending from one of its ends, and a rotative ring member mounted at one end of a rotor rotatably mounted on the shaft, the ring member being rotatable by a drive power derived from the same source of power as that used for said rotor. A pair of mating stamping rolls is pivotally connected to and lies in the same plane of rotation as the rotor, one of the stamping rolls being in driven engagement with the ring member. The rotor rotates at a different angular speed from that at which the ring member rotates, with the resulting speed differential being utilized to make the stamping rolls rotate on their own axes as they orbit about the axis of the rotor.

BRIEF DESCRIPTION OF THE DRAWINGS

FIG. 2 is a side elevation of the same;

FIG. 5b shows a segment of a filament which has been formed by the stamping roll of FIG. 5a;

FIG. 6b shows a segment of a filament stamped by the roll of FIG. 6a;

FIG. 7b shows a segment of a filament which has been stamped by the roll of FIG. 7a.

DETAILED DESCRIPTION

Figure 1:
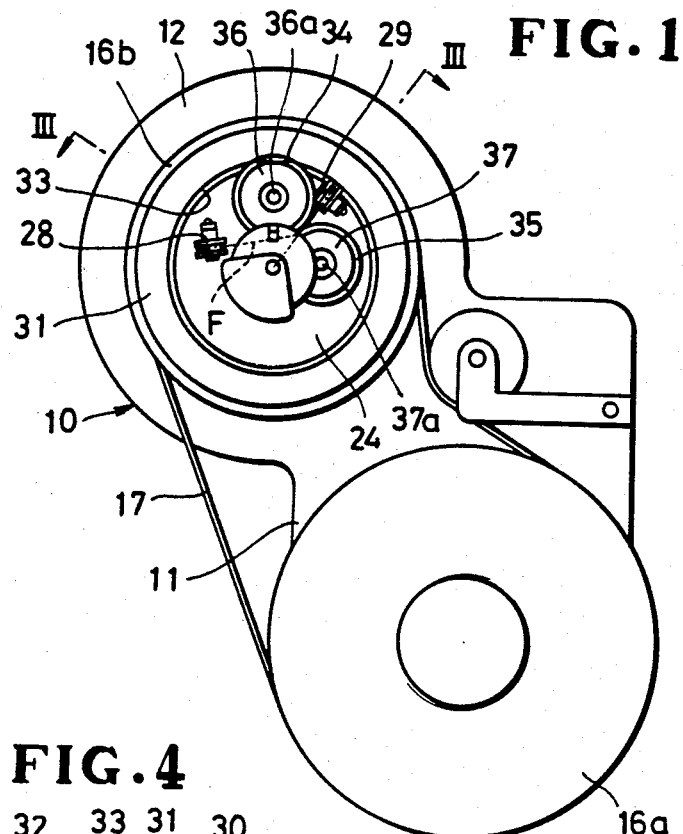
FIG. 1 is a front elevation of a stamping apparatus provided in accordance with the present invention.

Referring now to the drawings and to FIG. 2 in particular, there is shown an apparatus embodying the present invention for providing a plastic filamentary material with deformations of specified form and dimensions. The apparatus generally comprises a frame 10 having mounted at the lower portion thereof a drive unit 11 and at the upper portion an operating unit 12. The drive unit 11 includes a drive shaft 13 connected to a motor (not shown) and a first drive pulley 14a mounted fixedly on one end of the drive shaft 13 for transmitting rotating power to the operating unit via a first driven pulley 14b, the pulleys 14a and 14b being operatively connected by a drive belt 15. A second drive pulley 16a larger in diameter than the first drive pulley 14a is coaxially mounted on the other or opposite end of the drive shaft 13 and is operatively connected by a drive belt 17 to a second driven pulley 16b.

A horizontally mounted stationary shaft 18 is fixedly supported on the frame and has a bore 19 (FIG. 3) for guiding therethrough a supply of cord C.

Figure 3:
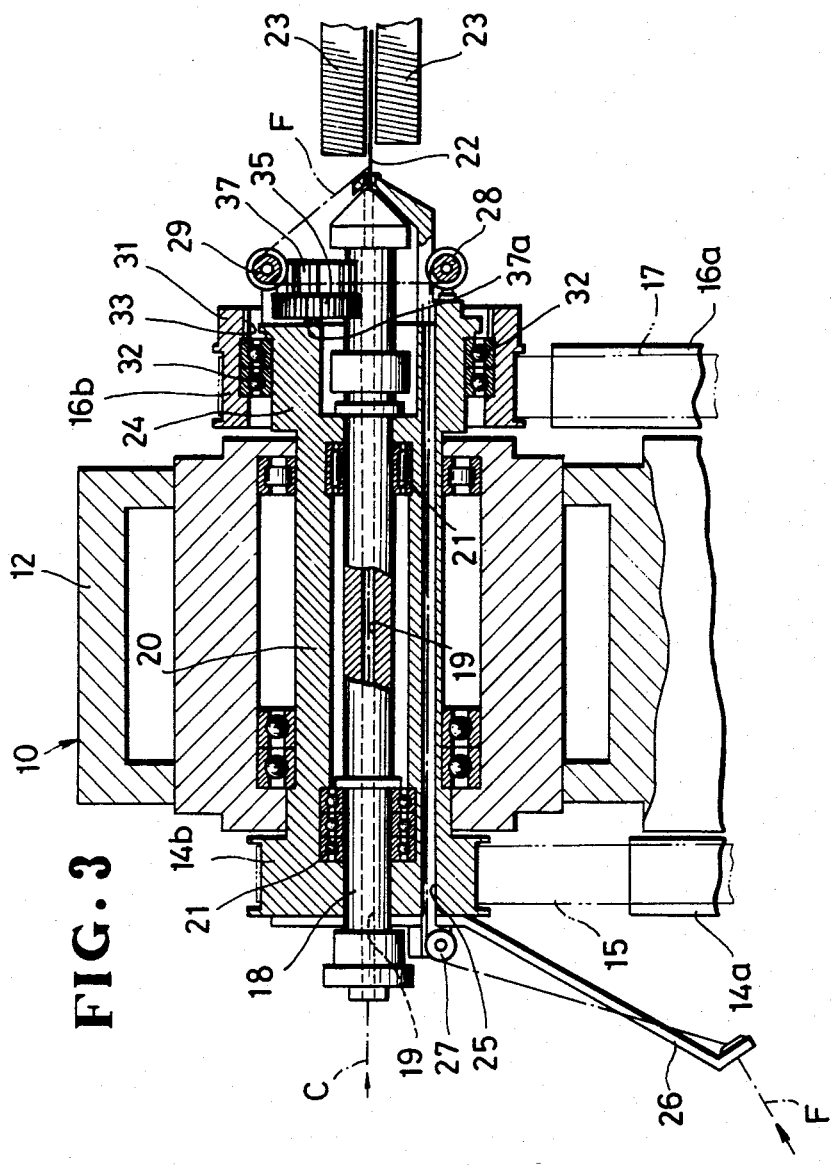
FIG. 3 is a cross-sectional view on an enlarged scale taken along line III—III of FIG. 1.
Figure 5A:
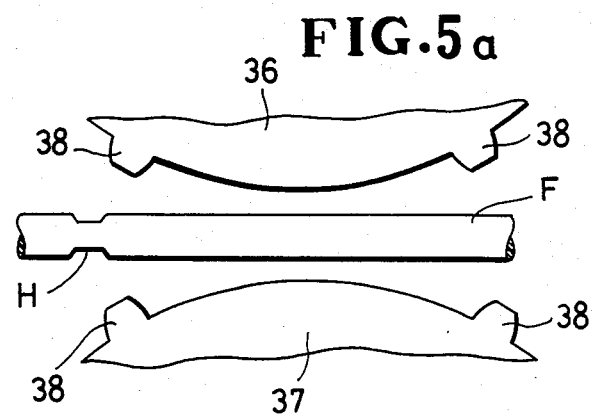
FIG. 5a is a diagrammatic view illustrating one form of a stamping roll embodying the invention.
Figure 5B:
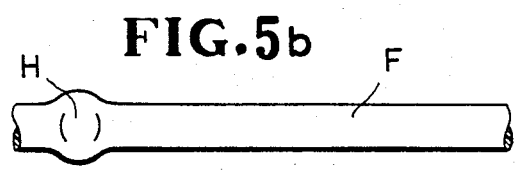
Figure 5C:
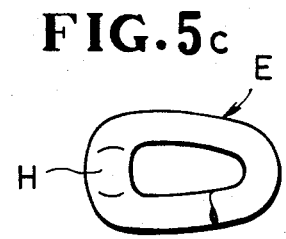
FIG. 5c is a diagrammatic view showing a coil or convolution formed from the filament of FIG. 5b.
Figure 6A:
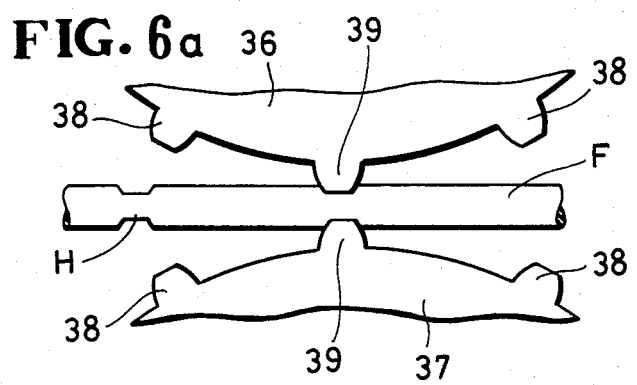
FIG. 6a is a diagrammatic view showing another form of a stamping roll according to the invention.
Figure 6B:
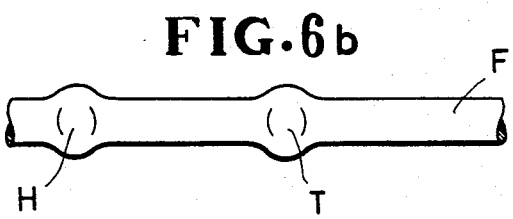
Figure 6C:
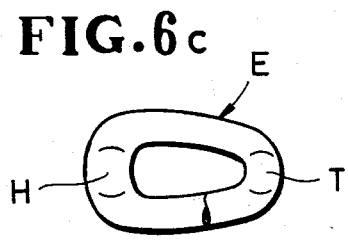
FIG. 6c diagrammatically illustrates a coil formed from the filament of FIG. 6b.
Figure 7A:
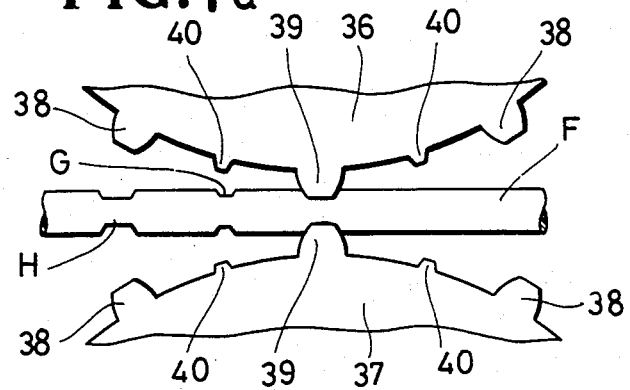
FIG. 7a is a diagrammatic view showing still another form of a stamping roll according to the invention.
Figure 7B:
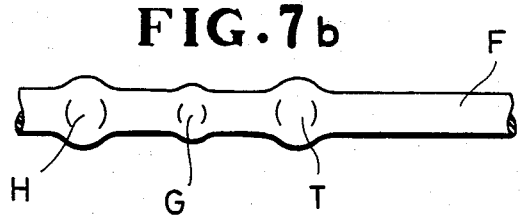
Figure 7C:
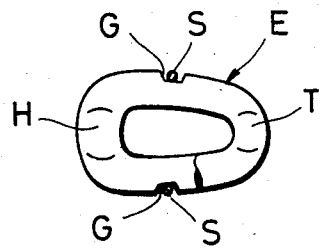
FIG. 7c diagrammatically shows a coil formed from the filament of FIG. 7b.

An elongate cylindrical member 20 is rotatably mounted on the stationary shaft 18 via bearings 21 as shown in FIG. 3, and extends in parallel with the drive shaft 13. The member 20 may be integral as shown or connected at one end to the first driven pulley 14b. At the forward end of the stationary shaft 18 adjacent to the second driven pulley 16b, there is provided a winding mandrel 22 operatively associated with a forming screw and heat-set unit 23.

A rotor 24, which may be integral with the cylindrical member 20, is provided at the other end of the member 20 opposite to the first driven pulley 14b. A guideway 25 extends longitudinally through the cylindrical member 20 and through the rotor 24 for guiding the passage of a filamentary material F which is supplied via a guide arm 26. The filament F passes around a first guide roll 27 and horizontally straight through the guideway 25 and around a second guide roll 28 where it is oriented upwardly and passes around a third guide roll 29 and finally reaches the mandrel 22.

Figure 4:
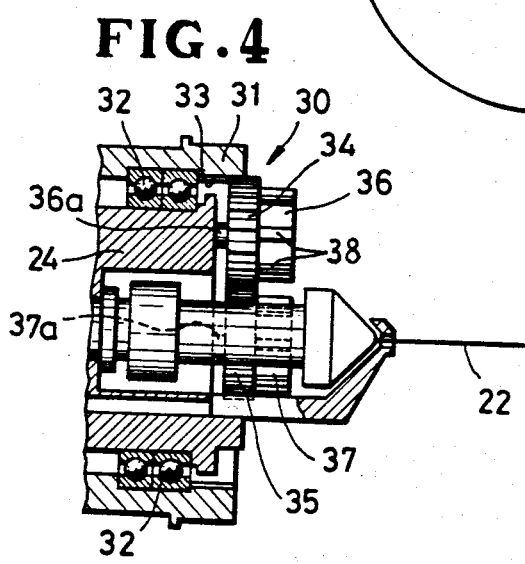
FIG. 4, appearing with FIG. 1, is a diagrammatic view showing an important operative part of the apparatus.

The apparatus of the character above described is a general construction utilized for feeding a filamentary material and forming the same into a row of continuous coils for attachment to stringer tapes in a well known manner. In accordance with the invention, there is provided a stamping tool 30 including a rotative ring member 31 which is integral with the second driven pulley 16b and rotatably mounted via a bearing 32 around the periphery of the rotor 24. As better shown in FIG. 4, the ring member 31 is internally toothed as at 33 for meshing engagement with one of a pair of mating gears 34 and 35. A pair of stamping rolls 36 and 37 are respectively joined with the mating gears 34 and 35, and are rotatably mounted on respective pins 36a and 37a secured to the forward end of the rotor 24. The stamping rolls 36 and 37 are rotatably mounted on the front end of the rotor 24 and have rotational axes parallel to each other and to the axis of the rotor 24. Each stamping roller 36, 37 is provided peripherally with stamping projections of the various forms illustrated in FIGS. 5a through 7a inclusive, the projections being spaced at predetermined intervals or pitches and those on one of the rolls are positioned to register with the corresponding projections on the other. A first one of such stamping projections 38 provides upon contact with the filament F a deformation therein which corresponds to a coupling head H of a coil element E.

A second projection 39 provides a similar deformation which corresponds to to a turn or connecting portion T of each coil E. A third stamping projection 40 is interposed between adjacent first and second projections 38 and 39 is and adapted to provide a deformation which serves as a guide groove G in the coil for anchoring a sewing thread S.

The mating projections 38 on their respective stamping rolls 36, 37 that form the coupling heads H are timed to come into confronting relation or register in position with each other during travel of the filament F between the second guide roll 28 and the third guide roll 29, and are so registered as the stamping rolls 36, 37 complete a full revolution on their own axes. In the presently illustrated embodiment, the rotor 24 rotates faster by angular speed than the ring member 31 with the resulting difference in their angular speed being utilized to effect the revolution of the stamping rolls 36, 37 on their own axes in opposite directions. Conversely, the rotor 24 may be rotated at a slower peripheral speed than that at which the ring member 31 rotates, in which instance the direction in which the filament F is wound on the mandrel 22 will be reversed. A differential in angular rotating speed between the rotor 24 and the ring member 31 is calculated such that the stamping rolls 36, 37 rotate on their axes by degrees corresponding to the distance between or the pitch of adjacent head-forming projection 38. Revolution of the rotor 24 causes the filament F to be wound on the mandrel 22, and one such revolution results in the formation of one convolution E of the coiled filament, during which time the stamping rolls 36, 37 rotate on their axes while orbitting about the axis of the rotor 24 and provide the various deformations; i.e. head H, turn T and groove G, on the filament F during its feed or travel towards the mandrel 22 as diagrammatically illustrated in FIGS. 5a–7a.

The filament F can be stamped with a high degree of accuracy because the ring member 31 carrying the stamping rolls 36, 37 is rotated at a constant speed by a drive power derived from the same source of power as that for the rotor 24 and thus can keep the rolls 36, 37 in accurate rotative and orbital movement. Because of such relationship between the rotor 24 and the ring member 31, the latter is an exact follower of the former regardless of the choice of speed for the winding of the filament F on the mandrel 22. In addition to these features, the present invention is advantageous in that the stamping station is located adjacent to the mandrel 22 to effect the stamping of the filament F immediately in advance of its being wound on the mandrel 22, thereby holding the filament F thus stamped or deformed immune to objectionable twists or other physical changes.

Having thus described the invention, it will be understood that various changes and modifications may be made in the specific embodiment herein advanced without departing from the scope of the appended claims. As for an instance, the arrangement of the apparatus may be modified so that the desired differential in angular speed between the rotor 24 and the ring member 31 may be obtained by rotating the latter conversely faster.

What is claimed is:

1. An apparatus for stamping a filamentary material for the production of a row of continuous coil coupling elements on a mandrel to be attached on slide fastener stringer tapes, said apparatus comprising:
    (a) a frame;
    (b) a stationary shaft mounted on said frame and having a mandrel extending from one end of said stationary shaft;
    (c) a driven rotor rotatably mounted on said stationary shaft;
    (d) a rotative ring member mounted at one end of said rotor and rotatable by a drive power derived from the same source of power as that for said rotor; and
    (e) a pair of mating stamping rolls rotatably mounted on one and the same end of said rotor and having rotational axes parallel to each other and to the axis of said rotor, one of said stamping rolls being in driven engagement with said ring member, said rotor rotating at a different angular speed from that at which said ring member rotates, with the resulting speed differential being utilized to make said stamping rolls rotate on their own axes as they orbit about the axis of said rotor.

2. An apparatus as defined in claim 1 wherein said stamping rolls are each provided peripherally with stamping projections which are timed to register with each other as said stamping rolls complete a full revolution on their axes.

3. An apparatus as defined in claim 1 wherein said rotor rotates at a faster angular speed than said ring member.

4. An apparatus as defined in claim 1 including a pair of coaxially mounted pulleys for driving said rotor and said ring member, respectively.

5. An apparatus as defined in claim 1 wherein said stamping rolls are located adjacent to said mandrel so as to effect the stamping of the filament immediately in advance of its being wound on said mandrel.

6. An apparatus as defined in claim 1, said ring member being internally toothed, and said stamping rolls having a pair of external gears, respectively, for corotation therewith, said gears being held in mesh with each other and one of said gears being held in mesh with said toothed ring member.

* * * * *